CODING SYSTEM

Filed March 22, 1966

3 Sheets-Sheet 1

INVENTORS,
YUKIHIKO MINEJIMI,
ZENITI KIYASU

CODING SYSTEM

Filed March 22, 1966

INVENTORS,
YUKIHIKO MINEJIMA,
ZENITI KIYASU

CODING SYSTEM

Filed March 22, 1966

INVENTORS,
YUKIHIKO MINEJIMA,
ZENITI KIYASU

United States Patent Office 3,488,762

Patented Jan. 6, 1970

3,488,762

CODING SYSTEM

Yukihiko Minejima, Tokyo, and Zeniti Kiyasu, Sendai-shi, Japan, assignors to Fujitsu Limited, Kawasaki-shi, Kanagawa-ken, Japan Filed Mar. 22, 1966, Ser. No. 536,339
Claims priority, application Japan, Mar. 24, 1965, 40/17,040
Int. Cl. H04l 3/00
U.S. Cl. 340—347 5 Claims

ABSTRACT OF THE DISCLOSURE

A coding system which converts an input PAM signal to a reflected binary code is disclosed. The system includes a comparator and a circulating network. The comparator produces a binary "1" whenever the input is positive and a binary "0" whenever the input is negative. The circulating network includes a rectifier, an adder, an amplifier, and a delay circuit. The output of the network is fed repeatedly through the comparator to produce a PCM signal.

BACKGROUND OF THE INVENTION

Field of the invention

This invention relates to improvements in or relating to a system for coding signals, adapted for use in the PCM-communication, telemetering or the like modern technique. More specifically, it relates to a coding system for converting input signals into reflected binary codes at a high speed.

Description of the prior art

In a certain type of coding system, such as, for instance, of the comparator type, the coding operation is carried into effect in such a way that the digital output signal from the comparator is fed back through a logic and memory circuit and a loading network switching means to the input so as to carry out a repeated comparison with an input signal. This kind of coding operation must rely upon highly complicated and intricate logic functions which necessarily produces an innegligible time lag.

BRIEF DESCRIPTION OF THE INVENTION

It is therefore the main object of the present invention to provide a coding system of the kind above referred to, capable of performing the repeating operation in the analogue mode.

Another object of the invention is to provide a coding system of the above nature, which is highly simple in its design and reliable in its operation with a higher speed than in the case of the conventional comparative technique.

Still another object of the invention is to provide a coding system of the above nature, capable of avoiding the signal overlapping operation with the input signal.

A further object is to provide a coding system, capable of operating in a unique mode.

These and further objects, features and advantages of the present invention will become more apparent as the description proceeds.

In the present novel coding system, the input signal is compared with a reference signal and the comparative signal output is fed through a kind of multifunction circulating network back to the input terminal of the coding system. Overlapping with the input signal is avoided. The network is capable of performing the function of rectification, addition, amplification and delaying.

The term "rectification" used herein is meant by such a function that a signal is divided about a bias level into two, either of which is then reversed in its phase or polarity. The term "addition" used herein is meant by such an operation that a plurality of signals are added to each other in the linear mode. The terms "amplification" and "delaying" may be of the same meanings which are normally understood by those skilled in the art.

BRIEF DESCRIPTION OF THE DRAWINGS

In the accompanying drawings, illustrative of preferred embodiment of the invention in no limiting sense:

FIGS. 4 (A)–(E) are a series of wave forms illustrative of the working principle of the present system, taking by way of example a specific signal as the input signal.

Now referring to the accompanying drawings, especially FIG. 1 thereof, the invention will be described more in detail.

Figures 1, 2:
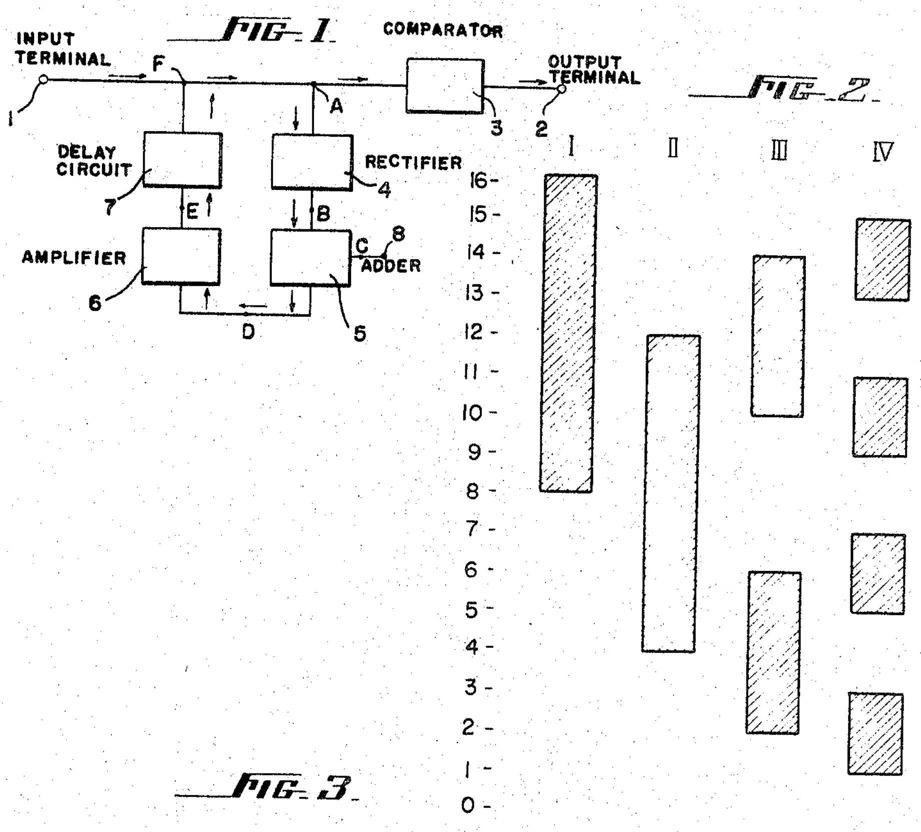
FIG. 1 shows a simplified block diagram of the system according to the invention.
FIG. 2 is a pattern diagram of repeated binary codes employable in the inventive system while assuming that the number of bits is four.

In FIG. 1, numeral 1 denotes an input terminal for receiving input signals to be processed in the system according to the invention, while 2 represents an output terminal adapted to deliver the processed signals. 3 denotes a comparator which is electrically connected said terminals 1 and 2. 4 represents a rectifier, the input of which is connected again to said terminals 1 and 2 via a junction point A, while the output of the rectifier 4 is connected via a point B to the input of adder 5, the output of the latter being connected via point D to the input of amplifier 6. Amplifier 6 is connected at its output and via a point E to the input of delay circuit 7, the output of which is connected via junction points F and A to the input of comparator 3. 8 denotes a local signal input terminal which is connected via a point C to a second input of adder 5 so as to add the local signal to the processed signal in the adder.

The coding system described briefly so far is adapted to deliver a series of reflected binary codes, such as those illustrated by a pattern diagram in FIG. 2 while assuming the number of bits be four.

In FIG. 2, I–IV represent the bit number, and the shaded and localized areas shown in this diagram demonstrate the existence of binary "1"-bits, while the remaining blank area as a whole specifies the existence of binary "0"-bits. From this pattern diagram, it will be seen that a decimal number "12" is represented by a binary number "1010" by way of example.

In the present embodiment, input signals fed through input terminal 1 thereto are classified to sixteen amplitude stages corresponding to sixteen decimal numbers 0, 1, 2–16 shown at the left-hand side of FIG. 2.

Figure 3:
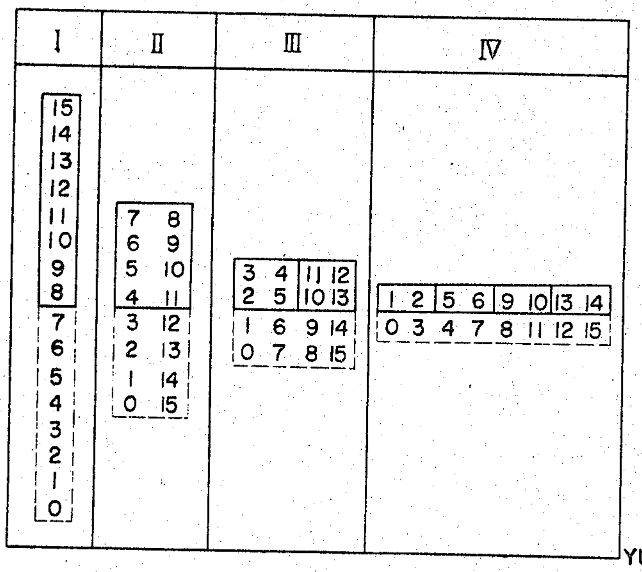
FIG. 3 is an explanatory diagram for the illustration of the working modes of the inventive system.

Now reviewing, as a whole, the sixteen specifically different decimal-binary coordinations shown in FIG. 2, so as to rearrange them into two groups relative to binary digits "1" and "0," respectively, a chart shown in FIG. 3 may be prepared. In this chart, full line blocks in bit columns represent the existence of binary signals "1," while dotted line blocks specify the existence of signals "0."

Upon further precisely reviewing the chart in FIG. 3, it can be observed that the full line block shown in the second bit column II may be obtained by folding over the full line block in the first bit column I about its lowermost marginal edge downwards and shifting the thus formed new block upwards by four steps. In the similar way, the full line block in the third bit column III can be obtained by folding over the local chart element in the preceding or second bit column II downwards about a horizontal center line in FIG. 3 and shifting the thus obtained new block upwards by two steps. In the similar way, the local chart element in the fourth bit column IV can be derived from that shown in the preceding or third bit column. It may be well supposed in this case wherein the number of bits is selected to be four as was already mentioned that the desired coding operation can be carried into effect by performing four successive signal comparisons in a comparator having a specific reference level 8.

Now turning back to FIG. 1, the reference level of comparator 3 and the biasing levels or rectifier and amplifier 6 are preset to the mean of the overall amplitude stages employed, or more specifically to the eighth amplitude stage "8" in this case. The function of rectifier 4 corresponds in this case to the aforementioned function for obtaining the pattern in the *i*-th column, FIG. 3, *i* being an integer expressed in the foregoing by II, III or IV, from the pattern prevailing in (*i–l*)th column the same figure, by folding over the upper half pattern about a horizontal center line. Further, the function of adder 5 corresponds to the upward shifting of the thus folded-over pattern by specified steps. Amplifier 6 functions so as to keep the amplitude of the additional local signal at a specified constant value. The amplification degree of this amplifier is normally "2," the phase of the signal thus processed therein being unchanged and the local signal having therefore for each bit ¼ of the number of overall amplitude stages. Delay circuit 7 is arranged for preventing the input signal and the outlet signal from the circulating system from overlapping with each other.

Figures 4A, 4B, 4C, 4D, 4E, 6:
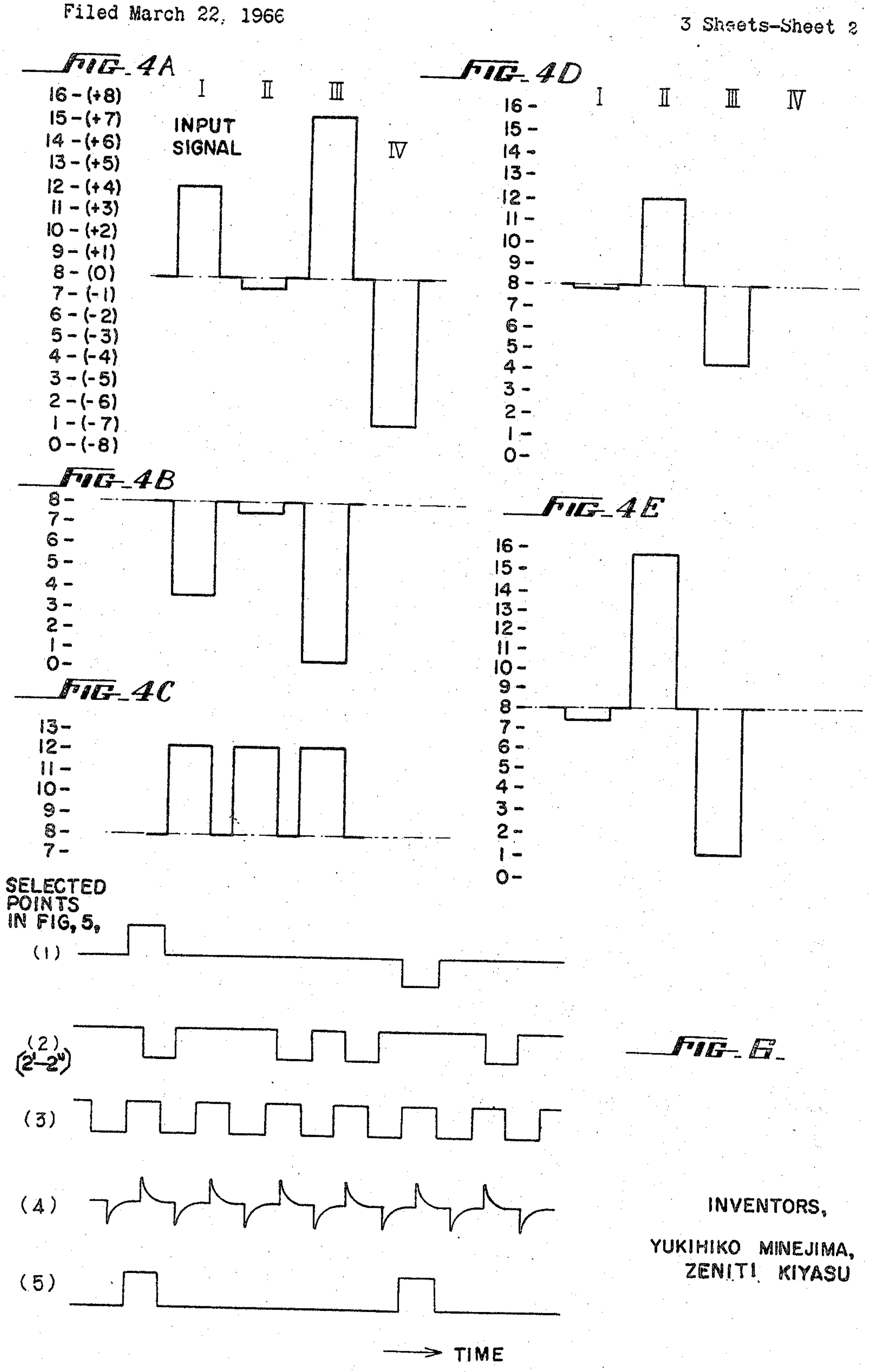
FIG. 6 is a time chart showing the forms of several signals as appearing at several points in the circuit shown in FIG. 5, while assuming that the number of bits is again four.

The operation of the aforementioned novel system will be more specifically described hereinbelow by way of four-bit coding operation:

An input signal pulse having a specific amplitude of 12.2 is now assumed to be applied onto the input terminal 1 in FIG. 1. This pulse is shown in FIG. 4(A) at I. The axis of abscissa represents time intervals plotted with a certain specific scale. In this figure, several wave forms as appearing in this case at several preselected points A, B, C, D and E, in the circuit shown in FIG. 1 are schematically illustrated in FIGS. 4(A)–(E) as identified by the same reference symbols with parentheses. Signal (C) is the local signal to be added to the output (B) of rectifier 4. Thus, it will be seen that the first pulse in the wave form at (A) corresponds to the input signal pulse above referred to, and *k*'th pulse (A) (*k* being an integer as expressed by hereinbefore II, III or IV) represents the feed back signal as appearing at the input junction F upon (*k–l*)th repeated circulation through the circulating system already referred to. The operation of the coding system according to the invention will be more clearly understood from the following description in the specific case where the input signal is "12.2." As seen in FIG. 2, this signal will become "1010" in binary code.

As already mentioned, comparator 3, rectifier 4, biasing adder 5, and amplifier 6 are operated such that the intermediate levels of their dynamic ranges are their reference levels. Since the dynamic ranges are from 0 to 16 in this case, the eighth amplitude stage "8" is their standard level. Therefore, pulses greater than "8" in amplitude are positive; and those less than "8," negative. Thus, in FIGS. 4(A)–(E), the eighth amplitude stage "8" is at the reference or zero voltage level. Accordingly, the input signal pulse "12.2" is translated to "+4.2."

The polarity of the input signal is determined by comparator 3. The signal "+4.2" shown in FIG. 4(A) at I being positive, a coded binary "1" is generated. Next, the signal "+4.2" is rectified to "−4.2" through rectifier 4 as shown in FIG. 4(B) at I. The thus rectified signal "−4.2" is added to a reference signal "+4.0" which is shown in FIG. 4(C) at I to produce a signal "−0.2" as shown in FIG. 4(D) at I. The signal "−0.2" is doubled by amplifier 6 so that the signal "0.4" is obtained as shown in FIG. 4(E) at I. The signal "−0.4" is delayed by delay circuit 7 and then fed to comparator 3 so as to produce the second bit of the code group. Since the signal "−0.4" is negative, a binary symbol "0" is generated.

The delayed signal "−0.4" is shown in FIG. 4(A) at II. Although this signal is rectified by rectifier 4, polarity is not changed because it is already negative. The output rectifier 4 is shown in FIG. 4(B) at II. The signal "−0.4" is added to the reference signal "+4.0" shown in FIG. 4(C) at II to produce a signal "+3.6" as shown in FIG. 4(D) at II. This signal "+3.6" is doubled by amplifier 6 to produce a signal "+7.2" as shown in FIG. 4(E) at II. The signal "+7.2" is delayed by delay circuit 7 and then fed to comparator 3 which generates a binary symbol "1" for the third bit of the coded signal.

The delayed signal "+7.2" is shown in FIG. 4(A) at III. This signal is rectified to "−7.2" as shown in FIG. 4(B) at III, and the reference signal "+4.0" shown in FIG. 4(C) at III is added to it to obtain a signal "3.2" as shown in FIG. 4(D) at III. This latter signal is then doubled to "−6.4" by amplifier 6 as shown in FIG. 4(E) at III. The signal "−6.4" is then fed through delay circuit 7. The delayed signal "−6.4" as shown in FIG. 4(A) at IV is fed to comparator 3 which produces a binary "0" for the fourth and last bit of the coded output signal. Thus, it may easily be seen that the pattern, in this case, of the output from comparator 3 will become "1010" in binary mode, thereby the original input signal "12.2" being transformed into the corresponding reflected binary code. In the present example so far described, the rectified waves have ben assumed to project downwards from the reference zero level.

Next, referring to FIGS. 5–6, the functioning mode of the present novel system will be described more specifically:

In these figures, terminal elements 1′ and 1″ constitute in combination the aforementioned input terminal at 1, FIG. 1, adapted for receiving a PAM-signal. In the same way, terminal elements 2′ and 2″ constitute in combination the aforementioned output terminal at 2, FIG. 1, arranged for delivering the output PCM-Block signal. X, Y and Z in these figures correspond respectively to rectifier 4, comparator 3 and a pulse generator which has been omitted from the foregoing description only for its basic and generalized nature. Summing amplifier S is a combination of adder 5 with amplifier 6, thus being of a kind of operational amplifier. The delay circuit 7 has been modified in the present embodiment into a delay line D as a representative embodiment. It is seen that there are provided a gate circuit G comprising a diode bridge as shown and a buffer amplifier B, the gain thereof being preferably selected to be unit, serving as reset means for the circulating system.

Since resistors $R_3$ and $R_4$ in rectifier circuit X are selected to be of equal resistance value, the outputs at the collector electrode and the emitter electrode of transistor $Q_1$ are reversed in their relative phase relation, yet having one and the same amplitude.

The working point of the transistor $Q_1$ is designed preferably in the following manner:

By properly selecting $+V_3$ source, or the ratio between resistors $R_1$ and $R_2$, or both, the emitter potential of $Q_1$ is equal to the input potential of summing amplifier, an example thereof being nil, when codedly transforming the input PAM-signal having no D.C-component. The +V, source is so adjusted that the potential at junction point *x*, between Zener diode ZD and diode $D_1$ is equal to that appearing at the emitter electrode of transistor $Q_1$.

Thus, when a positive signal pulse is applied onto the input terminal 1′–1″, the emitter electrode of transistor $Q_1$ will become positive so that diode $D_2$ is cut off, while the potential at junction point $x$ will become negative, thereby diode $D_1$ becoming conductive. On the other hand, when a negative pulse is impressed at the input, only diode $D_2$ will become conductive so that a rectifying operation thereof will be initiated.

As shown, comparator Y comprises preferably an "AND"-gate and a monostable blocking oscillator, as shown. When at least one input to the "AND"-gate is negative, as when there is no timing pulse or the input signal is negative, transistor $Q_2$ is cut off, and the voltage at terminal 2′ is $+V_4$. Upon coincidence of a timing pulse and a positive input pulse, both input diodes of the "AND"-gate are reverse biased, and current flows from the $+V_4$ source to the $-V_5$ source. As a result, the base of transistor $Q_2$ becomes positive thus turning transistor $Q_2$ on the transistor $Q_2$ will remain on for a period of time determined by the time constant of the LR circuit. The voltage at terminal 2′ thus becomes negative representing a binary "1" in the PCM-Block. Therefore, the emitter voltage source $-V_5$, for transistor $Q_2$ should be so adjusted that the oscillating operation of the blocking oscillator Y is caused to take place and be maintained for the time constant LR upon the coincidence of timing signals and input signals which are impressed on the terminal 1′–1″.

In the present embodiment so far described, negative polarity pulses will be delivered from output terminal 2′–2″ with a positive input signal applied the terminal 1′–1″.

Pulse generating circuit "Z" is so designed and arranged that the amplitude of the issuing rectangular pulses of the aforementioned additional signal is equal to ¼ of the overall amplitue step of the input PAM-signal to be codedly processed, as already referred to briefly hereinbefore. This generator Z delivers also the timing pulses for the comparator Y, as well as the reset pulses for the coding system as a whole. Output terminals for these three kinds of pulses are identified by means of references (3), (4) and (5) respectively, in FIGS. 5–6.

Figure 5:
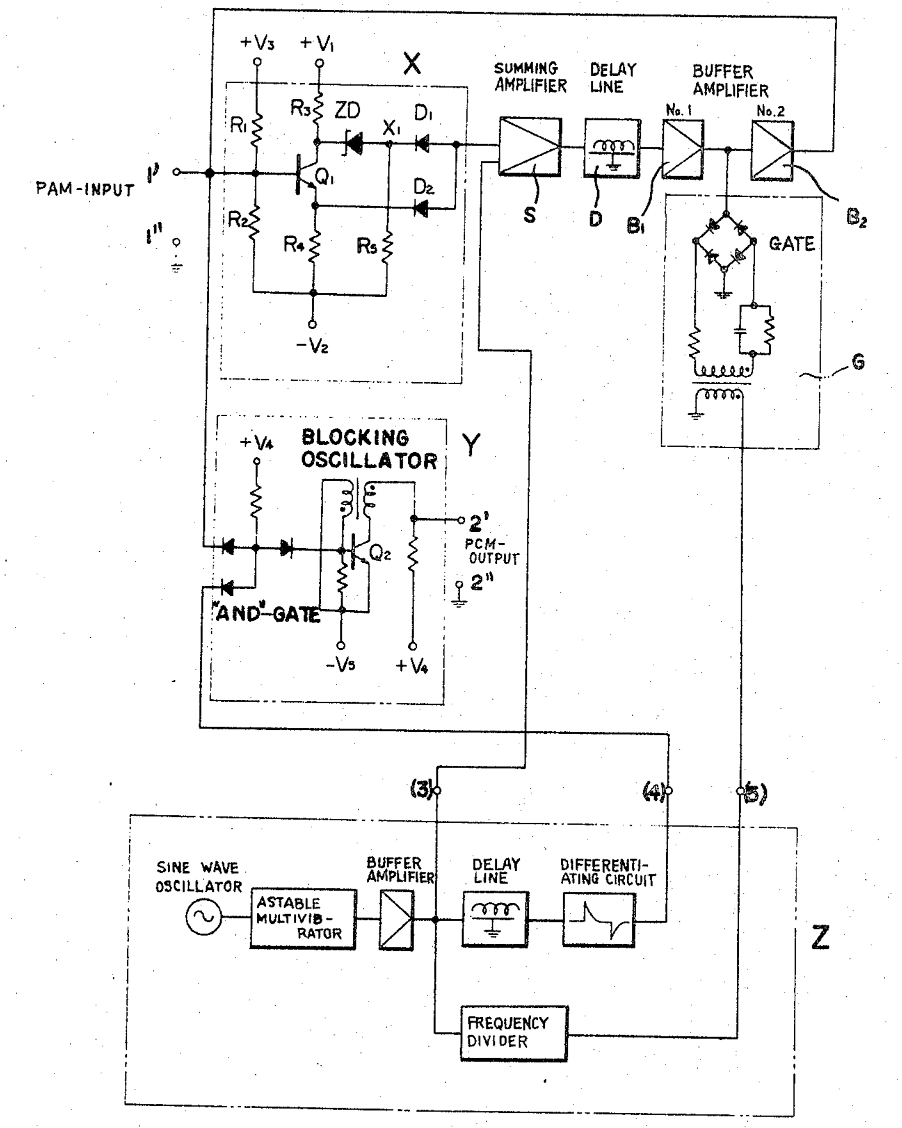
FIG. 5 is a wiring diagram illustrative in more detail of the embodiment shown in FIG. 1.

The local additional signal above referred to is generated in and delivered from an astable multivibrator synchronized by means of a stabilized sinusoidal timing signal, as will be clearly seen from the representation set forth in the lower left corner of FIG. 5.

The timing pulse for comparator Y are so generated and delivered that the local addition signal is processed in a further delay line so as to retard about ¼ the regular bit interval, and is differentiated.

Finally, the reset pulse is generated and delivered in such a way that said local signal is subjected to a frequency-dividing process so as to be divided by the number of bits, or more specifically "4" in the present specific embodiment. The reset pulse is required at the end of each PCM-Block signal to reset the coder for the next PAM input signal. Gate circuit G performs this function by shunting the output of buffer amplifier $B_1$ to ground. Buffer amplifier $B_2$ provides isolation for the input circuit when gate G is open.

In operation, a reset pulse fed to the transformer in gate G will bias the four diodes into conduction. The diode bridge gate is then on, and the output of buffer amplifier $B_1$ is shunted to ground. Thus, recirculation of the analog pulse in the network is stopped. The RC circuit in gate G serves to reverse bias the diodes in the absence of a reset pulse.

In FIG. 6, the several pulses concerned are diagrammatically represented although not to scale, in their wave form for a better understanding of the invention. More specifically, (1): input PAM-signal; (2): output PCM-signal; (3): additional local signal; (4): timing pulse for comparator; and (5): reset pulse.

Although in the foregoing a preferred embodiment of the invention has been illustrated only by way of example, various changes and modifications may easily occur to those skilled in the art upon reading through the foregoing specification, within the spirit and scope of the invention resorted to the appended claims.

For instance, D.-C.-current may be replaced with the local additional signal in pulse form.

The relative arrangement of the adder and the amplifier shown in FIG. 1 may be reversed in their order. In this modified arrangement, however, the amplitude of the local signal must be double the aforementioned value.

By modifying the voltage level impressed upon the terminal 8, nonlinear coding may, if necessary, be carried into effect, in place of the linear one described herein.

What we claim is:

1. In a coding system, comprising an input PAM-signal reception means, a PCM-signal output means, a comparator connected between said input signal means and said output signal means for comparing a received signal with a reference and generating a PCM-signal, and a circulating system connected between said input signal means and said comparator comprising a rectifier means for rectifying the received signal, an adder means connected with the output of said rectifier for adding a reference signal to the rectified signal, an amplifier having an amplifying factor of a predetermined integer for amplifying the output of said adder means, and a delay means for delaying said amplified signal relative to the impressed input signal and applying the thus delayed signal to the input of said compartor.

2. The system as set forth in claim 1, further comprising reset means connected in said circulating system for resetting said coding system at the end of each PCM-signal.

3. The system as set forth in claim 2 wherein said reset means includes a diode bridge gate.

4. The system as set forth in claim 1, further comprising timing means for providing timing signals to said comparator, said local signal to said adder means, and reset pulses to said reset means.

5. The system as set forth in claim 4 wherein said comparator includes an AND-gate connected to a monostable blocking oscillator, said AND-gate having two inputs one of which is connected to said input signal means and the other of which is connected to said timing means to receive said timing means to receive said timing signals.

References Cited

UNITED STATES PATENTS

| | | | |
|---|---|---|---|
| 2,660,618 | 11/1953 | Aigrain. | |
| 2,969,535 | 1/1961 | Foulkes | 340—347 |
| 3,071,727 | 1/1963 | Kitsopoulos | 340—347 |
| 3,164,826 | 1/1965 | McGrogan | 340—347 |
| 3,387,284 | 6/1968 | Munson et al. | 340—347 |

MAYNARD R. WILBUR, Primary Examiner

C. D. MILLER, Assistant Examiner